UNITED STATES PATENT OFFICE.

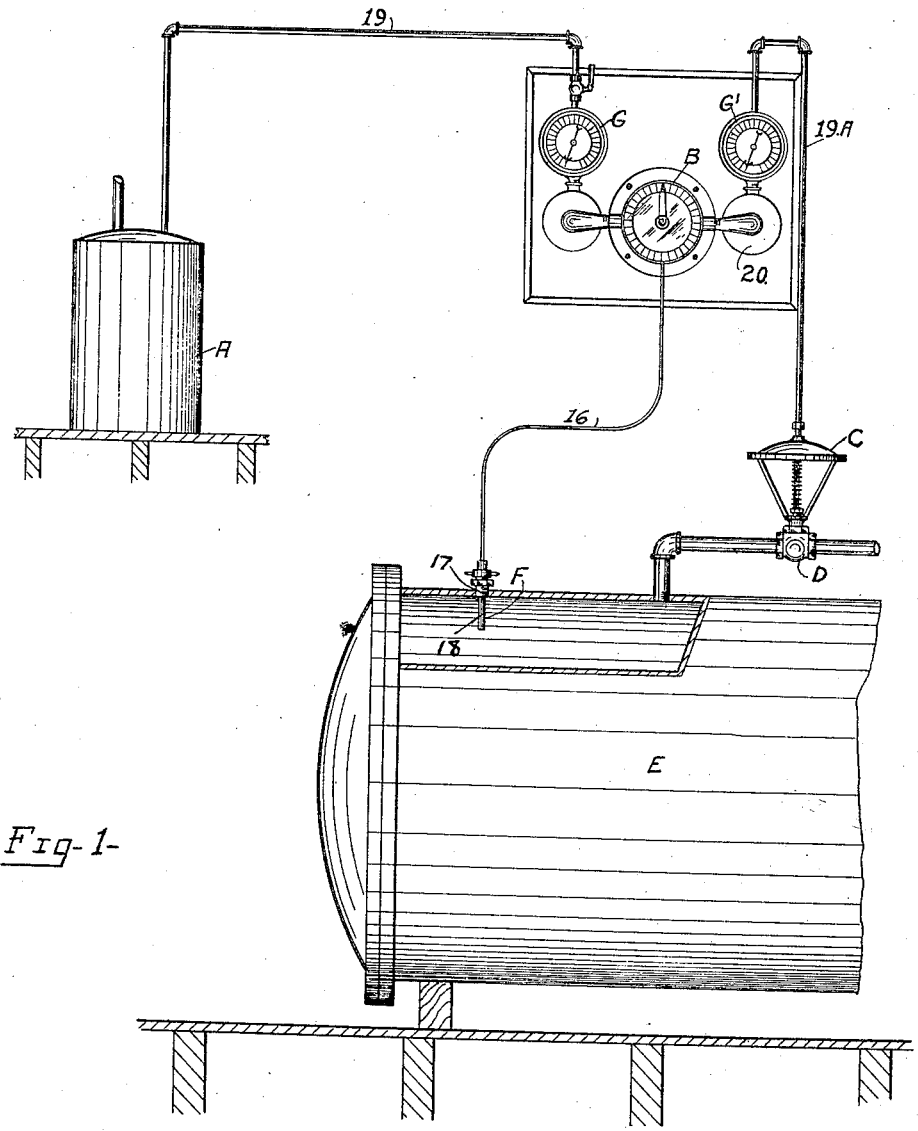
Fig-1-

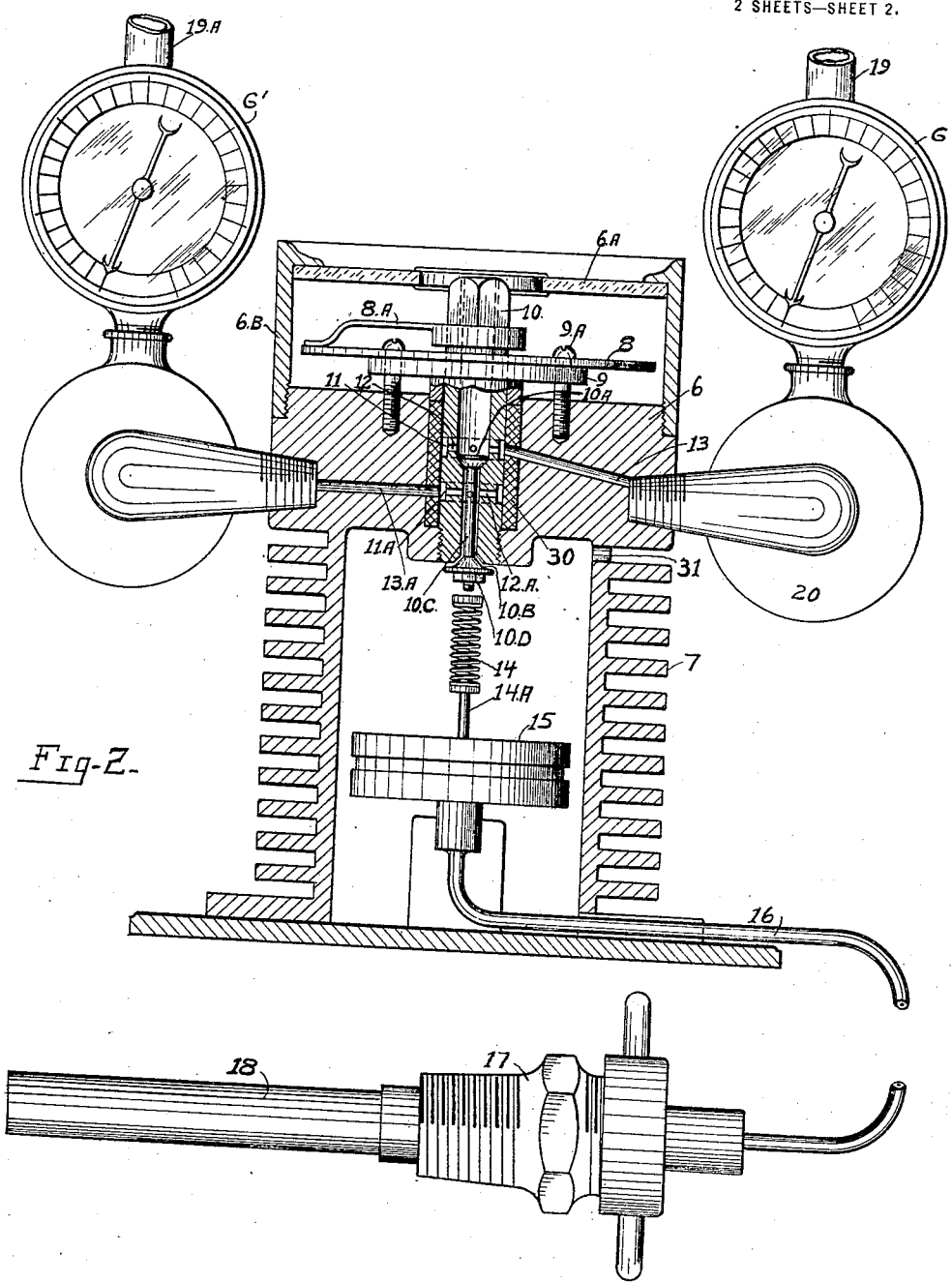

ALBIN J. NELSON, OF BROOKLYN, NEW YORK.

TEMPERATURE-REGULATOR.

1,175,171.  Specification of Letters Patent.  Patented Mar. 14, 1916.

Application filed January 18, 1915. Serial No. 2,855.

*To all whom it may concern:*

Be it known that I, ALBIN J. NELSON, a subject of the Kingdom of Sweden, residing at Brooklyn, in the county of Kings and State of New York, have invented certain new and useful Improvements in Temperature-Regulators, of which the following is a specification.

This invention relates to temperature regulators and controlling valves therefor, and is particularly useful in those devices or systems in which a thermostat controls a valve which governs the flow of fluid pressure from any source, such as a tank, to a motor which operates another valve controlling the supply of a heating fluid, such as steam, to a radiator.

The present improvement relates particularly to the controlling valve which governs the flow of pressure to the motor and has for its object to provide an improved valve mechanism which serves to admit pressure to the motor, or to exhaust pressure therefrom, according to temperature conditions, as well as to an improved system in which such valve mechanism is used.

A further object of this invention is to provide a construction which gives easy access to the valve mechanism and permits removal and replacing of said valve mechanism without taking apart the controller.

The invention is illustrated in the accompanying drawings in which—

Figure 1 is an elevation of a system in which the invention may be used. Fig. 2 is a sectional view of the controller or regulator valve mechanism.

The device may be operated by air, steam or other fluids, and merely for the purpose of illustration, A indicates a source of fluid pressure such as an air tank.

B indicates the regulator forming the subject of the present invention.

C is a motor controlling a valve D which controls the inlet of steam or other heating fluid to a tank E.

F is the thermostatic device which is located in the tank E.

19 is a pipe leading from the air tank A to the controller and $19^a$ is a pipe leading from the controller to the motor, and these pipes may be provided with filters or strainers 20 and pressure gages G and G'.

The cylindrical casing of the regulator is indicated at 6, and has a glass front $6^a$, and radiating ribs 7. These ribs are intended for use in the event that the operating fluid is steam, for the purpose of cooling the device, and they may be omitted if water or air is the operating fluid. The glass, $6^a$, is held by a frame $6^b$. On the head of the casing a dial 8 is mounted, and $8^a$ is a setting pointer for fixing the desired degree of heat.

10 is a hollow valve casing or plug located in the head of the regulator casing, and surrounded by a packing 30 which is tightened by the flange 9 and the screws $9^a$ extending through the same, and also serving to support the dial 8. The pointer $8^a$ is fixed on the end of the plug 10, which is squared to receive a wrench so that it may be set at adjustment. The casing 10 is screwed into the head of the cylinder 6, and by turning the same its position may be varied for adjustment. This casing 10 is provided with an upper circumferential groove 11 and a lower circumferential groove $11^a$. The former communicates by a passage 13 with the pipe 19, and the latter communicates by a passage $13^a$ with the pipe $19^a$. Ports 12 connect the groove 11 with the hollow part of the plug 10, and ports $12^a$ connect the groove $11^a$ with the reduced bore of said plug. A double acting valve comprising a stem $10^c$ fits loosely in said reduced bore and is provided at its upper end with a valve disk or head $10^a$, and at its lower end with a disk or head $10^b$, said heads seating respectively against seats formed at the opposite ends of the said bore. The lower head $10^b$ is adjustable, by screwing on the stem, and is fixed at adjustment by the nut $10^d$. A spring 14 is supported by a stem $14^a$ connected to the expansible capsule 15, which is connected by a tube 16 and coupling 17 to a thermostatic bulb 18 which contains an expansible fluid and is the active element of the thermostatic device F located as stated in the tank to which heat is to be supplied, and by means of which a constant degree of heat is maintained.

It will be noted that the passage from the groove 11 to the groove $11^a$ is through the interior of the plug 10 and is controlled by the valve $10^a$; also that the passage from the groove $11^a$ to the hollow part of the casing 6 is through the bore which is controlled by the valve $10^b$.

31 is a vent outlet from a casing 6.

The operation is as follows: Assuming that the tank E and consequently the bulb 18 are cold, the capsule 15 is deflated by contraction of the expansible fluid, and the pressure entering at the passage 13 and ports 12 closes the valve 10ᵃ and opens the valve 10ᵇ, which bleeds or exhausts the pressure through the ports 12ᵃ, passage 13ᵃ and pipe 19ᵃ from the motor device C, and the valve D is opened by a spring provided for that purpose, as in well known systems, admitting steam to the tank E. When the tank containing the bulb 18 becomes heated the capsule 15 is expanded, which lifts the valves, closing or partly closing the valve 10ᵇ, and opening the valve 10ᵃ. When the latter is open the pressure from the inlet side passes through the ports 12 and 12ᵃ and passage 13ᵃ, and pipe 19ᵃ, to the motor C, which for example may be of the diaphragm type, and under this pressure said motor acts to close the valve D, and shut off the supply of steam to the tank E. If the heat is not sufficiently great to close the valve 10ᵇ, it will partly close the same, and thereby give a throttling effect, part of the pressure passing through the passage 13ᵃ to the motor and part being vented by the valve 10ᵇ, thereby reducing the effective pressure on the motor C, and consequently varying the extent of closure of the steam valve D. Therefore the regulator will be automatically operated to control the amount of pressure supplied to the motor C, consequently controlling the opening of the valve D to a corresponding extent.

When the plug 10 is turned and thus screwed in or out it varies the relative distance between the lower valve seat 10ᵇ and the plate at upper end of spring 14 and capsule 15, and consequently varies the opening and closing of said valves according to the temperature desired.

It must be understood that the stem 14ᵃ holding spring 14 to the capsule 15 is fixed and only moves by the action of the capsule.

What I claim as new is:

1. In a valve mechanism, the combination of a casing having inlet and outlet passages, a plug in said casing having spaced circumferential grooves communicating with said passages respectively, and also having a longitudinal bore with side ports communicating with said grooves and with a vent port, said bore also having opposite valve seats, connected valves coöperating with said seats, one valve controlling the flow between said side ports and the other valve controlling the vent port, and an operating device for the valves.

2. A valve mechanism for thermostatic regulators, comprising, in combination, a casing having inlet and outlet passages therein for fluid pressure, a turning plug screwed into said casing and having a longitudinal bore forming part of said passage and open at one end to form a vent, said bore having opposite valve seats, and said plug having spaced circumferential grooves communicating with said passages respectively and ports connecting the bore and grooves, a stem extending in said bore, inlet and exhaust valves coöperating with said seats and located at opposite ends of the stem, the inlet valve controlling the passage and opening against the pressure therein, and the exhaust controlling the vent, and an operating device engageable with said stem at the end opposite the inlet valve, to operate the valves.

In testimony whereof, I affix my signature in presence of two witnesses.

ALBIN J. NELSON.

Witnesses:
JOHN A. BOMMHARDT,
J. B. DAVIS.

Copies of this patent may be obtained for five cents each, by addressing the "Commissioner of Patents, Washington, D. C."